United States Patent Office 2,802,819
Patented Aug. 13, 1957

2,802,819

ACYLATED PRODUCTS

Edgar Lederer, Sceaux, and Jean Marcel Asselineau, Asnieres, France, and Hubert Bloch, New York, N. Y., assignors to Ciba Pharmaceutical Products, Inc., Summit, N. J.

No Drawing. Application July 13, 1954,
Serial No. 443,168

Claims priority, application Switzerland July 24, 1953

8 Claims. (Cl. 260—210)

The present invention relates to the manufacture of new acylated products and in particular to a process for the manufacture of acylated derivatives of saturated organic polyhydroxyl or polyhydroxyamino compounds which contain as an acyl residue the residue of a propionic acid having a free, esterified or etherified hydroxyl group in β-position, and in α- and β-positions aliphatic residues containing together at least 10 carbon atoms. These compounds, such as the residue of the polyhydroxyl or polyhydroxyamino compounds may contain further substituents, such as free or functionally converted aldehyde or keto-groups. The invention is primarily concerned with the manufacture of acylated derivatives of mono-, di- or trisaccharides, of inositols or of corresponding compounds in which a hydroxyl group is replaced by an amino group, or of their O- or N-alkyl or lower aliphatic acyl derivatives especially of saccharides or amino saccharides which contain 5 or 6 carbon atoms in each carbon chain, more particularly of D-glucosamine. In these compounds the above defined propionyl residue is a substituent primarily of any hydroxyl group, for example a primary or secondary hydroxyl group or a hydroxyl group of an acetal residue. This invention is thus mainly concerned with the production of esters of the said polyhydroxy or polyhydroxy amino compounds. However, the amino group of the polyhydroxy amino compounds may also carry the propionyl residue in which case the product is an amide. The acyl residues of the type set forth above are derived chiefly from carboxylic acids and their analogues such as can be isolated by extraction of M. tuberculosis and of diphtheria bacilli; they are derived in particular from mycolic acid of the formula

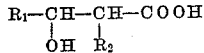

in which R₁ represents a branched aliphatic chain containing about 59 atoms of carbon and which can contain free, esterified or etherified hydroxyl groups or oxo groups, and R₂ represents a normal tetracosanyl residue.

These new acylated derivatives especially the O-(methoxyaceto-α₁-mycolyl)-N-acetyl-D-glucosamine have an interesting physiological activity. More especially they have an effect upon the development of tuberculosis bacilli and they influence the modifications which these bacilli produce in animal organisms, for example the condition of immunity. They can be employed as medicaments especially as immunizators or as intermediate products for the manufacture of valuable products.

These new acylated derivatives can be prepared by methods known per se. For example, propionic acids, having in β-position a free, esterified or etherified hydroxyl group and in α- and β-positions aliphatic residues containing together at least 10 carbon atoms, their salts or functional acid derivatives, for example their halides, can be reacted upon saturated organic polyhydroxyl or polyhydroxy amino compounds or upon their functional derivatives, for example their esters with hydrohalic acid.

For this purpose starting materials are used in which those hydroxyl and/or amino groups which should not take part in the reaction may be protected. If desired, such groups may afterwards be reconverted into free hydroxyl and/or amino groups.

The starting materials employed in the present process have either already been described in literature (cf. Bull. Soc. Chim. Biol., vol. 33, p. 1003 (1951); Experientia, vol. 7, p. 283 (1951); Biochem. et Biophys. Acta, vol. 7, p. 126 (1951) and Bull. Soc. Chim., vol. 1952, p. 413 and 560) or they can be prepared by processes known per se. Those are preferred which lead to the aforementioned especially valuable end products.

The new compounds can be used as medicaments, for example in the form of pharmaceutical preparations containing them in admixture with pharmaceutical organic or inorganic carrier materials suitable for enteral, parenteral or local application. For the preparation thereof such substances are concerned as do not react with the new compounds, as for example, water, gelatine, lactose, starch, magnesium stearate, talc, vegetable oils, benzyl alcohols, gum, polyalkylene glycols, Vaseline, cholesterol or other known medicament carriers. The pharmaceutical preparations can be made up, for example, as tablets, dragees, salves, creams or in liquid form as solutions, suspensions or emulsions. They may, if desired, be sterilized and/or contain auxiliary substances, such as preservative, stabilizing, wetting or emulsifying agents, salts for variations of the osmotic pressure of buffer substances. They can also contain other substances of therapeutic value. The preparations are formulated by customary methods.

The following examples illustrate the invention, the relation between part by weight and part by volume being the same as that between the gram and the cubic centimeter:

Example 1

1.9 parts by weight of α-mycolic acid test are subjected to the addition of 10 parts by volume of thionyl chloride and the whole heated on an oil bath for just sufficient time for solution to take place. After two hours of contact at room temperature, the thionyl chloride is expelled under vacuum and the residue taken up in 5 parts by volume of anhydrous benzene, evaporated to dryness and then dissolved in 5 parts by volume of benzene.

The benzene solution of mycolyl chloride is poured dropwise into a solution of 0.5 part by weight of N-acetyl-D-glucosamine dissolved in 20 parts by volume of anhydrous pyridine, at room temperature. The solution is allowed to stand for 72 hours with occasional heating in a bath to 60° C.

The reaction mixture is then poured into ice water, acidified and extracted with ether. The extraction and washing are complicated by the continuous formation of emulsions.

The crude product obtained is chromatographed over 30 parts by weight of alumina (neutralized, activity I–II). From the solution obtained by elution with petroleum ether 0.436 part by weight of a substance is obtained. This product is chromatographed over 100 parts by weight of silicic acid. On elution with a mixture of equal parts of benzene and ether there is obtained 0.06 part by weight of O-mycolyl-N-acetyl-D-glucosamine which, when dissolved in ether and precipitated by methanol, is obtained in the form of a nearly white powder of melting point 43–44° C., [α]_D=9° (in chloroform).

The α-mycolic acid used as the starting material is described in Experientia, vol. 7, p. 283 (1951).

Example 2

2 parts by weight of a dihydroxy-α-mycolic acid, obtained from the streptomycin-resisting H-37 Rv strain of tubercle bacilli, are dissolved at room temperature in 15 parts by volume of thionyl chloride. The solution is allowed to stand for three hours, the excess thionyl chloride then evaporated under reduced pressure, the residue taken up in 5 parts by volume of anhydrous benzene, evaporated to dryness again and the residue dissolved again in 5 parts by volume of benzene. The resulting solution of the acid chloride is introduced into 0.75 part by weight of N-acetyl-D-glucosamine, dissolved in 60 parts by volume of anhydrous pyridine. The mixture is allowed to stand at room temperature for 72 hours and is then worked up as described in Example 1. The resulting crude condensation product is then adsorbed on a column of 45 parts by weight of alumina. By elutriation with carbon tetrachloride there are obtained 1.15 parts by weight of a substance which is then adsorbed on 160 parts by weight of silicic acid and elutriated by means of ether containing 20% methanol in admixture. By evaporating the resulting solution, taking up the residue in ether and precipitation with methanol there is obtained 0.4 part by weight of O-(sulfito-mycolyl)-N-acetyl-D-glucosamine in the form of a slightly yellow powder melting at 47–50° C., $[\alpha]_D = +2°$ (in chloroform).

The dihydroxy-α-mycolic acid used as the starting material is described in Bull. Soc. Chim., vol. 1952, p. 560.

*Example 3*

0.075 part by weight of the O-(sulfito-mycolyl)-N-acetyl-D-glucosamine obtained according to Example 2 are refluxed for 30 minutes in 5 parts by volume of benzene, 5 parts by volume of ethanol and 1 part by volume of concentrated hydrochloric acid. The reaction mixture is then taken up in water, extracted with ether, the ethereal extracts combined, washed with water until neutral, and dried over sodium sulfate. The product obtained on evaporating the ether is purified by taking it up in ether and precipitating it with methanol. There is obtained 0.060 part by weight of O-mycolyl-N-acetyl-D-glucosamine as a yellow solid of melting point 43–45° C.

*Example 4*

By a method analogous to that described in Example 2, a dihydroxy-mycolic acid, obtained from the streptomycin-resisting H-37 Rv strain of tubercle bacilli, is reacted with thionyl chloride and condensed with N-acetyl-D-glucosamine. The resulting product is adsorbed on 45 parts by weight of aluminum oxide and elutriated with ether containing 20% ethanol. On precipitation from the ethereal solution by means of methanol there is obtained 0.25 part of O:O'-di-(sulfito-mycolyl)-N-acetyl-D-glucosamine in the form of a slightly yellowish powder of melting point 41–43° C. $[\alpha]_D = -5°$ (in chloroform).

*Example 5*

0.9 part of the acetate of a methoxy-mycolic acid, obtained from the streptomycin-resisting H-37 Rv strain of tubercle bacilli, are dissolved in 8 parts by volume of thionyl chloride and allowed to stand for 3 hours. After evaporation of the excess thionyl chloride, the resulting acid chloride is taken up in 5 parts by volume of benzene. It is then slowly added to a solution of 0.25 part by weight of N-acetyl-D-glucosamine in 10 parts by volume of pyridine. The reaction solution is allowed to stand at room temperature for 4 hours and at 37° C. for 14 hours. It is then worked up as indicated in Example 2 and the product chromatographed over 25 parts by weight of a mixture of silicic acid and Celit (2:1). By elutriation with a mixture of benzene and ether (1:1) and with ether, a product is obtained which is subjected to chromatography over 15 parts by weight of alumina. By means of ether containing 20% methanol there is obtained 0.1 part by weight of O-(methoxy-aceto-mycolyl)-N-acetyl-D-glucosamine, which after being dissolved in ether and precipitated therefrom with methanol melts at 42–44° C. $[\alpha]_D = +15°$ (in chloroform).

The methoxy-mycolic acid, the acetate of which is used as the starting material, is described in Biochem. et Biophys. Acta, vol. 7, p. 126 (1951).

In an analogous manner there is obtained from the acid chloride of an acetylated α-mycolic acid, obtained from the bovine strain Marmorek, with N-carbobenzoxy-D-glucosamine a slightly yellow wax of melting point 42–44° C.

*Example 6*

From 1.2 parts by weight of dihydroxylated mycolic acid, obtained from the streptomycin-resisting H-37 Rv strain of tubercle bacilli, there is obtained by the action of thionyl chloride, an acid chloride which, after being taken up in 5 parts by volume of benzene, is slowly added at room temperature to a suspension of 0.5 part by weight of finely powdered N-acetyl-D-glucosylamine in 30 parts by volume of anhydrous pyridine. The mixture is allowed to stand for 3 days during which time it is shaken from time to time. It is then worked up as described in Example 1. The condensation product is then adsorbed on 25 parts by weight to alumina. On elutriation with carbon tetrachloride there is obtained 0.2 part by weight of a nearly white powder which contains chiefly O-(sulfito-mycolyl)-N-acetyl-D-glucosylamine of melting point 46–48° C.

The dihydroxy-α-mycolic acid used as the starting material is described in Bull. Soc. Chim., vol. 1952, p. 560.

*Example 7*

By a procedure analogous to that of Example 5 there is obtained from 1 part by weight of the acetate of a mycolic acid obtained from the streptomycin-resisting H37 Rv strain of tubercle bacilli an acid chloride which is taken up in 5 parts by volume of benzene and slowly added to 0.75 part by weight of α-D-methyl-glucoside in 20 parts by volume of anhydrous pyridine. After allowing the reaction mixture to stand for 3 days at room temperature, it is worked up in a manner analogous to that described in Example 1. The resulting crude condensation product is adsorbed on 25 parts by volume of alumina, elutriated with carbon tetrachloride, the resulting 0.35 part by weight of substance is again chromatographed over 30 parts by weight of silicic acid, the column rinsed with a mixture of benzene and ether (1:1) and with pure ether. There is thus obtained 0.16 part by weight of O-(aceto-mycolyl)-α-D-methyl-glucoside of melting point 37–39° C.

The acetate of the mycolic acid used as the starting material is described in Experientia, vol. 7, p. 283 (1951).

*Example 8*

The aceto-mycolic acid chloride obtained according to Example 7 is taken up in 5 parts by volume of benzene and added dropwise to a solution of 0.4 part by weight of N-acetyl-D-methyl-glucosaminide in 20 parts by volume of anhydrous pyridine. The reaction mixture is allowed to stand for 3 days and then worked up as described in Example 1. 0.12 part by weight of O-(aceto-mycolyl)-N-acetyl-D-methyl-glucosaminide is obtained as a slightly yellow body of melting point 42–44° C.

*Example 9*

Mycolyl chloride is prepared as described in Example 1 using as starting material 2 parts by weight of mycolic acid and the product is taken up in 5 parts by volume of anhydrous benzene.

The solution of the acid chloride is poured into a solution of 0.8 part by weight of tetracetyl-1:3:4:6-D-glucosamine in 8 parts by volume of anhydrous pyridine, while cooling in ice water. A gelatinous precipitate is immediately produced. The mixture is allowed to return to room temperature and left to stand for 18 hours with periodic shaking and occasional heating in a bath to 60° C.

The reaction mixture is then poured into ice water and the whole is acidified with sulfuric acid and extracted with chloroform. The chloroform extracts are combined, washed with water and dried with sodium sulfate and the chloroform is then evaporated. The product obtained, which is a faint yellow waxy solid, is taken up in a little chloroform and precipitated with excess of methanol in order to eliminate the majority of the tetracetylglucosamine remaining unreacted.

The product obtained is chromatographed over 45 parts by weight of neutralized alumina (activity I–II). From the solution obtained by elution with carbon tetrachloride the solvent is evaporated and 0.676 part by weight is obtained of N-mycolyl-tetracetylglucosamine. After reprecipitation of an ethereal solution of this compound by means of methanol, the compound is produced in the form of a faintly yellow powder of melting point 42–45° C. and neutral reaction $[\alpha]_D = +5°$ (CHCl₃).

0.04 part by weight of the above product is dissolved in 2 parts by volume of benzene and subjected to the addition of 0.15 part of potassium carbonate dissolved in 2 parts by volume of methanol. The mixture is heated for 3 hours under reflux. The product of the hydrolysis, isolated in the customary manner, is precipitated from its ethereal solution with methanol. N-mycolyl-D-glucosamine is thus obtained in the form of an almost white neutral powder of melting point 50–53° C.

*Example 10*

In a manner analogous to that described in Example 2 there is obtained from 1.1 parts of the acetate of natural coryno-mycolic acid with 15 parts by volume of thionyl chloride an acid chloride which is taken up in 5 parts by volume of anhydrous benzene and slowly added to a solution of 0.3 part of N-acetyl-D-glucosamine dissolved in 40 parts by volume of anhydrous pyridine. The whole is allowed to stand for 18 hours at 37° C. and the reaction product is worked up in the same manner as described in Example 1. The resulting crude product is adsorbed by 25 parts of aluminum oxide. By extraction with ether containing 20 percent methanol there is obtained 0.22 part of O-(aceto-coryno-mycolyl)-N-acetyl-D-glucosamine in the form of a pale yellow substance melting at 30–35° C., $[\alpha]_D = +13°$ (chloroform).

The natural coryno-mycolic acid, the acetate of which is used as the starting material, is described in Bull. Soc. Chim. Biol., vol. 33, p. 1003 (1951).

*Example 11*

From 1.2 parts of a methoxylated mycolic acid there is obtained by a method analogous to that described in Example 2 an acid chloride which is taken up in 5 parts by volume of benzene and slowly added to a solution of 0.2 part of N-acetyl-D-glucosamine in 20 parts by volume of pyridine. The reaction mixture is allowed to stand for 48 hours at room temperature and then worked up as described in Example 1. The resulting crude product is chromatographed over 30 parts of aluminum oxide. By extraction with ether containing 20 percent methanol there is obtained 0.35 part of O:O'-bis-(methoxy-mycolyl)-N-acetyl-D-glucosamine as an almost white substance melting at 50–53° C., $[\alpha]_D = +3°$ (in chloroform).

The methoxy-mycolic acid used as the starting material is described in Biochem. et Biophys. Acta, vol. 7, p. 126 (1951).

What is claimed is:

1. Acyl derivatives of compounds selected from the group consisting of D-glucosamine, D-methyl glucosaminide, α-D-methyl glucoside and their lower alkyl and alkanoyl derivatives and carbobenzoxy derivatives, wherein the acyl radical is that of a member selected from the group consisting of mycolic acids of the formula:

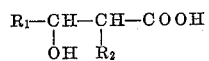

in which R₁ represents a branched aliphatic chain containing about 59 carbon atoms and R₂ stands for a normal tetracosanyl radical, their esters with inorganic acids, lower fatty acids and ethers with lower alkanols.

2. O-acyl derivatives of N-lower alkanoyl-D-glucosamine, wherein the acyl radical is that of a member selected from the group consisting of mycolic acids of the formula:

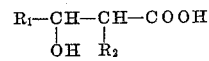

in which R₁ represents a branched aliphatic chain containing about 59 carbon atoms and R₂ stands for a normal tetracosanyl radical, their esters with inorganic acids, lower fatty acids and ethers with lower alkanols.

3. O-acyl derivatives of α-D-methyl-glucoside, wherein the acyl radical is that of a member selected from the group consisting of mycolic acids of the formula:

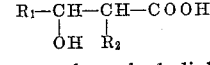

in which R₁ represents a branched aliphatic chain containing about 59 carbon atoms and R₂ stands for a normal tetracosanyl radical, their esters with inorganic acids, lower fatty acids and ethers with lower alkanols.

4. O-mycolyl-N-acetyl-D-glucosamine.

5. O - (methoxy - aceto - mycolyl) - N - acetyl - D-glucosamine.

6. O-(aceto-mycolyl)-α-D-methyl-glucoside.

7. O - (aceto - mycolyl) - N - acetyl - D - methyl - glucosaminide.

8. O - (aceto - coryno - mycolyl) - N - acetyl - D - glucosamine.

References Cited in the file of this patent

UNITED STATES PATENTS

| | | |
|---|---|---|
| 2,667,478 | Schwartz | Jan. 26, 1954 |
| 2,703,798 | Schwartz | Mar. 8, 1955 |